Feb. 24, 1953     J. D. LANGDON     2,629,393

COMBINED CHECK VALVE AND VENT VALVE

Filed May 5, 1949

Inventor:

Jesse D. Langdon

Patented Feb. 24, 1953

2,629,393

UNITED STATES PATENT OFFICE 2,629,393

COMBINED CHECK VALVE AND VENT VALVE

Jesse D. Langdon, Long Beach, Calif.

Application May 5, 1949, Serial No. 91,589

7 Claims. (Cl. 137—217)

1

The present invention relates to combined check valves and vent valve of that class designed to be attached to a source of fluid supply; with the object in view of preventing backflow into the fluid supply line when a sub-atmospheric condition of pressure exists therein; with the further object of permitting air to enter a casing surrounding a check valve member inserted in the casing, together with means to close the air vents at such times as pressure exists within the casing.

Other and further objects and purposes will appear during the progress of the specification; as illustrated by the drawings which show two forms of reduction to practice which it is specifically understood may be changed within the scope of the claims.

Figure 1:
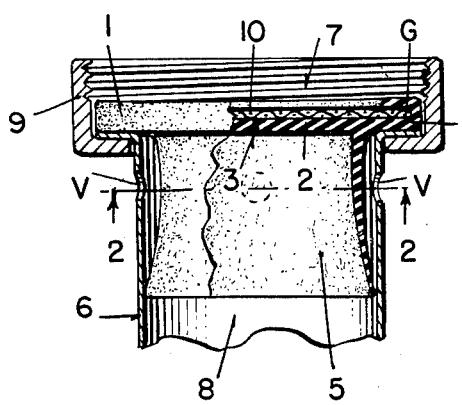
Fig. 1 is a vertical section of the device showing the check valve member 1 partly cut away in section.

The construction of the invention consists of:

A check valve member 1 made of deformable material capable of retaining normal shape and having a normally closed intake end forming a partition 2—2E, slit element 3 or 3F forms a normally closed passage extended transversely thru the closed end 2 and 2E. The annular supporting means 4 integral with the closed end 2 or 2E, skirt element 5 being extended forwardly of one side of said closed end 2 or 2E, the open end of the skirt 5 distal to the intake end 2 or 2E forming the discharge end of said valve member; the forwardly projecting skirt 5 being inserted into a hollow casing 6 or 6C having an inlet 7 and an outlet 8. Vent means V ported thru the wall of said casing 6, attaching means 9 or 9A formed by a threaded nut, the supporting means 4 of the member 1 juxtaposed with said attaching means 9 or 9A of said casing 6 to secure said member 1 and 1A in operative position within said casing 6, the distal end of said skirt 5 extended toward said outlet 8 and adapted to contact the wall of said casing 6 between said vent means V and said outlet 8 under the influence of internal pressure, thereby closing said vent

2 means V against the egress of internal pressure; said slit means 3 providing a passageway for pressure fluid thru the intake end 2 or 2E. A mesh or screen member 10 or 10M has the outer periphery thereof inserted into an internal groove G of the support 4 and serves to prevent the portion of the closed end 2 or 2E bordering the slits 3 or 3S from being forced open toward the inlet 7 by external or reverse pressure entering the discharge end of member 1 or 1D.

Figure 3:
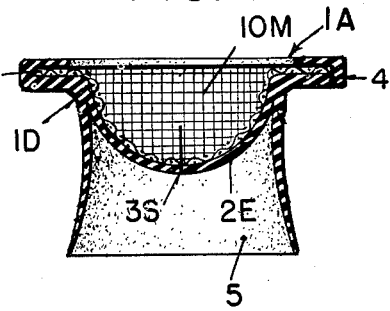
Fig. 3 is a vertical sectional view of the member 1D, being a modified form of member 1, Fig. 1.
Figure 2:
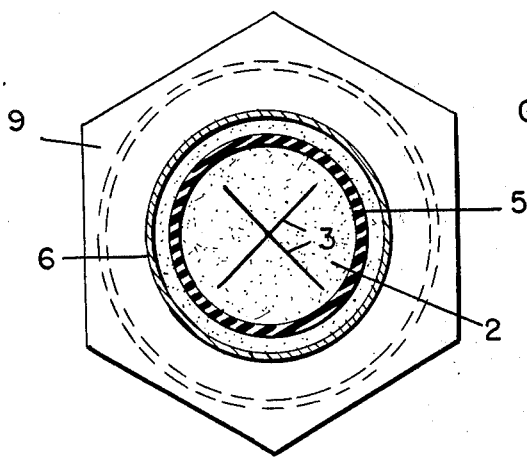
Fig. 2 is a plan view looking up showing a cross section of skirt 5 and casing 6 as at 2—2, Fig. 1.
Figure 4:
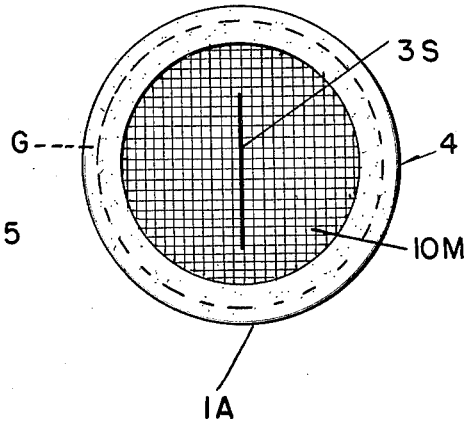
Fig. 4 is a plan view of Fig. 3 looking down.
Figure 5:
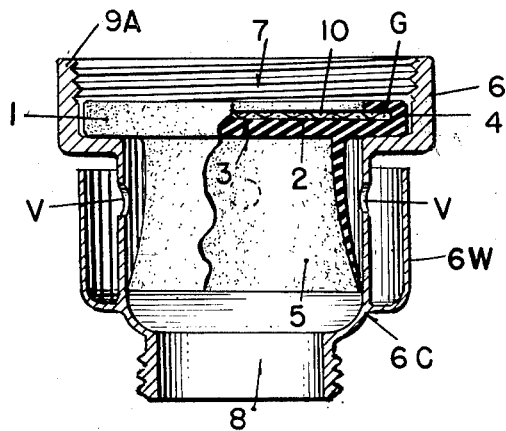
Fig. 5 is an alternative form of the device in vertical section, member 1 partly cut away.
Figure 6:
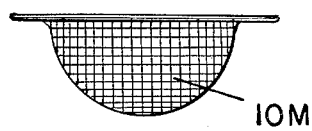
Fig. 6 is a detail elevation of screen member 10M as of Fig. 3.

The mesh or screen 10 Figs. 1 and 5 is disc shaped while the modification 10M Fig. 3 is formed with a downwardly projecting dome conforming with the closed intake end 2E of the member 1D. The outer circumference of meshed member 10 or 10M is inserted into groove G.

Fig. 1 illustrates a two piece casing formed of a flanged tube 6 and a nut 9 while Fig. 5 shows a one piece casing 6 and nut 9A.

Fig. 5 shows the casing 6C having a protective wall 6W extended over vents V and spaced away from the external wall of casing 6C.

The device operates as follows:

When pressure fluid enters the inlet 7, the slit means 3 or 3S is forced apart and pressure within the skirt 5 urges the latter against the wall of the casing 6 or 6C between the vents V and the outlet 8 closing said vents against the egress of fluid. The vent means V is open when member 1 or 1D is in normal position of rest.

When a sub-atmospheric pressure exists at the inlet end the partition wall bordering the slit element 3 or 3S is urged against the screen or mesh 10 or 10M and the slit element remains closed against the ingress of external pressure toward the inlet.

Having described the invention and the operation thereof the following claims are made:

1. For insertion into a hollow casing having inlet and outlet ends and vent means thru the wall of the casing between the two ends; a tubular valve member made of deformable material capable of returning to shape and comprising an enlarged intake end formed with annular supporting means adapted to conform with the inlet end of a casing for retaining the valve member in operative position, a partition closing the tube between said intake end and the discharge end of the tubular member, said discharge end formed by a skirt depending from said partition and adapted to project toward the outlet end of the casing beyond the vent means provided for said casing, said partition being slit to provide a normally closed passage adapted to open under fluid pressure exerted from the intake side of said partition permitting pressure fluid to activate and expand said skirt.

2. A device as of claim 1 assembled with the dependent projecting skirt being inserted into a casing having an inlet end and an outlet end, vent means thru the wall of said casing, attaching means provided at the inlet end of the casing to retain the annular supporting means of the valve member, a meshed member resting against that side of the partition that is toward the inlet and being juxtaposed with said attaching means of said casing to secure said member in operative position within said casing, the discharge end of said skirt extended beyond said vents toward said outlet being adapted to contact the wall of said casing between said vent means and said outlet under the influence of internal pressure, thereby closing said vent means against the egress of internal pressure fluid, the slit means providing the intake passageway for pressure fluid thru the valve member, the meshed member having its peripheral edge juxtaposed with the intake end of said valve member and serving to support and prevent that portion of the closed end bordering the slits from being forced apart and toward the inlet by external pressure when a sub-atmospheric pressure exists at said inlet end of said casing.

3. A valve member as of claim 1 wherein the normally closed slit partition is formed by a substantially flat diaphragm.

4. A valve member as of claim 1 wherein the slit partition is shaped to form a domed diaphragm extending across the inner diameter of the skirt.

5. In combination a casing having an inlet and outlet, vents thru the wall of said casing between said inlet and outlet, attaching means for a source of supply provided at said inlet end of said casing, a diaphragm juxtaposed within said attaching means and being slit to provide a passageway thru said diaphragm under the influence of pressure, mesh means of rigid material extended across the inlet end of said casing and contacting said diaphragm whereby said diaphragm is prevented from flexing in the direction that is toward the inlet of said casing when a sub-atmospheric pressure exists at the inlet end of said casing, the outlet side of said diaphragm being free to move forwardly toward said outlet to open the slit passageway and permit pressure fluid to pass from the inlet to the outlet, the terminal ends of said slit passageway being encompassed by a forwardly projecting skirt extended beyond the vent means and toward the outlet end of said casing whereby pressure fluid passing thru said slit passageway will urge the wall of said skirt radially outward to contact the internal wall of said casing and close said vent means against the egress of internal fluid pressure.

6. A device as of claim 5 wherein the diaphragm is curved and a meshed member of rigid material shaped to conform with the diaphragm is juxtaposed together with said diaphragm on that side which is toward the inlet, said diaphragm being curved to increase the extent and flexibility thereof and permit the same to expand radially toward the inner wall of the skirt.

7. A valve member made of deformable material for a device of the kind described comprising a transverse diaphragm portion with an annular skirt projecting forwardly of one side of the diaphragm, slit means thru said diaphragm the ends of said slit means limited to the inner diameter of said skirt, the side of said diaphragm opposite to said skirt having a portion extended radially outward thereof, then radially inwardly forming a groove circumventing the inside of the last named extended portion and adapted to receive the periphery of a rigid meshed member.

JESSE D. LANGDON.

REFERENCES CITED

The following references are of record in the file of this patent:

UNITED STATES PATENTS

| Number | Name | Date |
| --- | --- | --- |
| 2,236,477 | Fuchs | Mar. 25, 1941 |
| 2,270,737 | Langdon | Jan. 20, 1942 |
| 2,292,373 | Groeniger | Aug. 11, 1942 |
| 2,371,449 | Langdon | Mar. 13, 1945 |
| 2,382,427 | Langdon | Aug. 14, 1945 |